United States Patent
Stojanovski et al.

(10) Patent No.: US 9,650,794 B2
(45) Date of Patent: May 16, 2017

(54) APPARATUS, SYSTEM AND METHOD OF STEERING DATA RADIO BEARER TRAFFIC TO A WIRELESS LOCAL AREA NETWORK LINK

(71) Applicant: Intel IP Corporation, Santa Clara, CA (US)

(72) Inventors: Alexandre S. Stojanovski, Paris (FR); Alexander Sirotkin, Giv'on Hachadasha (IL); Pingping Zong, Randolph, NJ (US)

(73) Assignee: INTEL IP CORPORATION, Santa Clara, CA (US)

( * ) Notice: Subject to any disclaimer, the term of this patent is extended or adjusted under 35 U.S.C. 154(b) by 74 days.

(21) Appl. No.: 14/314,256

(22) Filed: Jun. 25, 2014

(65) Prior Publication Data

US 2015/0043447 A1    Feb. 12, 2015

Related U.S. Application Data

(60) Provisional application No. 61/863,902, filed on Aug. 8, 2013.

(51) Int. Cl.
*H04W 4/00* (2009.01)
*E04G 23/02* (2006.01)
(Continued)

(52) U.S. Cl.
CPC ......... *E04G 23/0218* (2013.01); *E04H 9/025* (2013.01); *H04B 7/0617* (2013.01);
(Continued)

(58) Field of Classification Search
CPC .................. H04W 72/0406; H04W 76/023
(Continued)

(56) References Cited

U.S. PATENT DOCUMENTS

| 7,613,171 B2 | 11/2009 | Zehavi et al. |
| 2009/0221325 A1 | 9/2009 | Periyalwar et al. |

(Continued)

FOREIGN PATENT DOCUMENTS

| EP | 2624632 | 8/2013 |
| WO | 2013067464 | 5/2013 |

(Continued)

OTHER PUBLICATIONS

International Search Report and Written Opinion for PCT Application No. PCT/US2014/050031, mailed on Nov. 14, 2014, 12 pages.
(Continued)

*Primary Examiner* — Ricky Ngo
*Assistant Examiner* — Wei-Po Kao
(74) *Attorney, Agent, or Firm* — Shichrur & Co.

(57) ABSTRACT

Some demonstrative embodiments include devices, systems of steering data radio bearer traffic to a wireless local area network link. For example, a User Equipment (UE) may include a Wireless Local Area Network (WLAN) transceiver; a cellular transceiver to communicate traffic of a plurality of Data Radio Bearers (DRBs) via a cellular link between the UE and an evolved Node B (eNB); and a controller to establish at least one Point-to-Point (P2P) link with the eNB via a WLAN link between the UE and a WLAN Access Point (AP), and to steer traffic of one or more of the DRBs from the cellular link to the P2P link.

25 Claims, 5 Drawing Sheets

(51) Int. Cl.

| | | |
|---|---|---|
| *H04L 5/14* | (2006.01) | |
| *H04W 56/00* | (2009.01) | |
| *H04W 52/02* | (2009.01) | |
| *H04W 76/04* | (2009.01) | |
| *H04W 36/08* | (2009.01) | |
| *H04W 72/08* | (2009.01) | |
| *H04W 76/02* | (2009.01) | |
| *H04W 36/28* | (2009.01) | |
| *H04L 5/00* | (2006.01) | |
| *H04W 24/10* | (2009.01) | |
| *H04L 1/18* | (2006.01) | |
| *H04B 7/06* | (2006.01) | |
| *E04H 9/02* | (2006.01) | |
| *H04W 16/26* | (2009.01) | |
| *H04W 24/02* | (2009.01) | |
| *H04W 48/16* | (2009.01) | |
| *H04W 72/04* | (2009.01) | |
| *H04W 4/02* | (2009.01) | |
| *H04W 36/14* | (2009.01) | |
| *H04L 27/26* | (2006.01) | |
| *H04W 88/08* | (2009.01) | |
| *H04W 48/12* | (2009.01) | |
| *H04W 74/08* | (2009.01) | |

(52) U.S. Cl.
CPC ......... *H04B 7/0626* (2013.01); *H04B 7/0639* (2013.01); *H04L 1/1812* (2013.01); *H04L 5/0048* (2013.01); *H04L 5/0058* (2013.01); *H04L 5/14* (2013.01); *H04W 4/005* (2013.01); *H04W 16/26* (2013.01); *H04W 24/02* (2013.01); *H04W 24/10* (2013.01); *H04W 36/08* (2013.01); *H04W 36/28* (2013.01); *H04W 48/16* (2013.01); *H04W 52/0206* (2013.01); *H04W 52/0209* (2013.01); *H04W 52/0219* (2013.01); *H04W 56/0005* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01); *H04W 4/023* (2013.01); *H04W 36/14* (2013.01); *H04W 48/12* (2013.01); *H04W 72/0406* (2013.01); *H04W 72/0446* (2013.01); *H04W 74/0833* (2013.01); *H04W 88/08* (2013.01); *Y02B 60/50* (2013.01)

(58) Field of Classification Search
USPC .................................. 370/310–350, 431–463
See application file for complete search history.

(56) References Cited

U.S. PATENT DOCUMENTS

| | | | | |
|---|---|---|---|---|
| 2011/0170506 | A1* | 7/2011 | Zisimopoulous | H04L 47/14 370/329 |
| 2011/0222523 | A1 | 9/2011 | Fu et al. | |
| 2012/0163179 | A1 | 6/2012 | Jo et al. | |
| 2015/0156774 | A1* | 6/2015 | Urie | H04L 5/001 370/329 |
| 2015/0305070 | A1* | 10/2015 | Ahmad | H04W 48/20 370/338 |

FOREIGN PATENT DOCUMENTS

| | | |
|---|---|---|
| WO | 2013100629 | 7/2013 |
| WO | 2013104951 | 7/2013 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
3GPP TR 23.852 V1.7.0 (Jul. 2013), 3rd Generation Partnership Project; Technical Specification Group Services and System Aspects; Study on S2a Mobility based on GTP and WLAN access to EPC (SaMOG); Stage 2 (Release 12), Jul. 2013, 167 pages.
3GPP TR 37.834 V0.3.0 (May 2013), 3rd Generation Partnership Project; Technical Specification Group Radio Access Network; Study on WLAN/3GPP Radio Interworking (Release 12), May 2013, 14 pages.
3GPP TS 23.401 V12.1.0 (Jun. 2013), 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 2013, 291 pages.
3GPP TS 23.402 V12.1.0 (Jun. 2013), 3rd Generation Partnership Project; Technical Specification Group Services and System Aspects; Architecture enhancements for non-3GPP accesses (Release 12), Jun. 2013, 254 pages.
ETSI TS 136 300 V11.3.0 (Nov. 2012), LTE; Evolved Universal Terrestrial Radio Access (E-UTRA) and Evolved Universal Terrestrial Radio Access Network (E-UTRAN); Overall description; Stage 2 (3GPP TS 36.300 version 11.3.0 Release 11), Nov. 2012, 217 pages.
International Preliminary Report on Patentability for PCT/US2014/050031, mailed on Feb. 18, 2016, 11 pages.
European Search Report for European Patent Application No. 14833905.4 mailed on Feb. 13, 2017, 9 pages.

* cited by examiner

APPARATUS, SYSTEM AND METHOD OF STEERING DATA RADIO BEARER TRAFFIC TO A WIRELESS LOCAL AREA NETWORK LINK

CROSS REFERENCE

This application claims the benefit of and priority from U.S. Provisional Patent Application No. 61/863,902 entitled "Advanced Wireless Communication Systems and Techniques", filed Aug. 8, 2013, the entire disclosure of which is incorporated herein by reference.

TECHNICAL FIELD

Some embodiments described herein generally relate to steering data radio bearer traffic to a wireless local area network link.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between WLAN and cellular networks. For example, 3rd Generation Partnership Project (3*GPP*) *TR* 37.834 ("*Technical Specification Group Radio Access Network; WLAN/3GPP Radio Interworking (Release* 12)"), relates to potential Radio Access Network (RAN) level enhancements for WLAN/3GPP Interworking. The 3GPP specifies several features for 3GPP-WLAN interworking. For example, 3GPP TS 23.402 ("*Technical Specification Group Services and System Aspects; Architecture enhancements for non-*3*GPP accesses* (*Release* 12)") describes a Non-Seamless WLAN Offload (NSWO) feature, a Multiple Access Packet Data Network (PDN) Connectivity (MAPCON) feature, and an Internet Protocol (IP) Flow Mobility (IFOM) feature.

However, these features may be limited to specific implementations and/or architectures, may increase complexity, may affect efficiency, and/or may not be transparent to some elements of the system.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
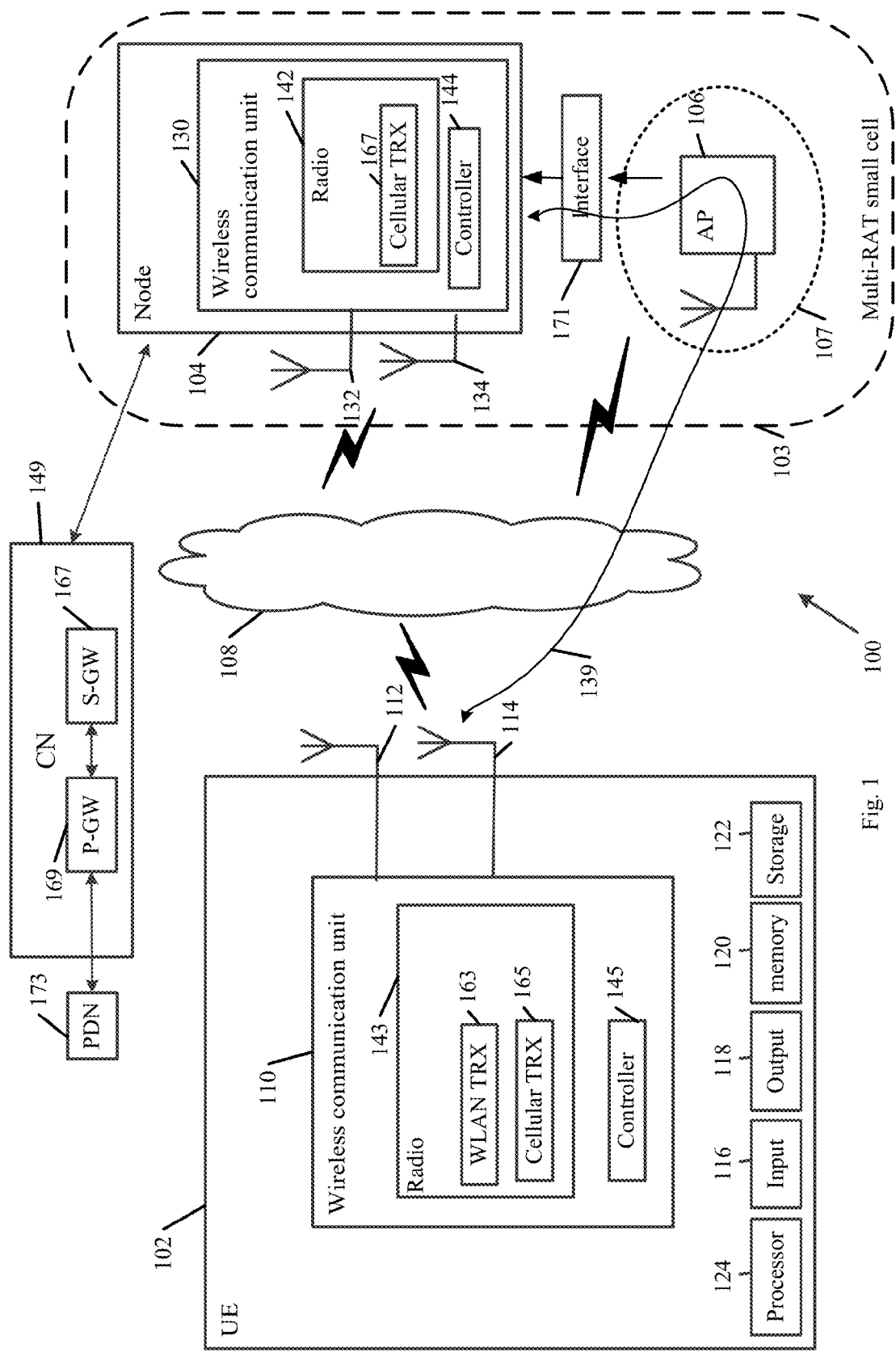
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3rd Generation Partnership Project (3GPP) TR 37.834 ("*Technical Specification Group Radio Access Network; WLAN/3GPP Radio Interworking (Release 12)*", V0.2.1, Jun. 2, 2013); 3GPP TS 23.402 ("*Technical Specification Group Services and System Aspects; Architecture enhancements for non-3GPP accesses (Release 12)*", V12.1.0, Jun. 21, 2013); 3*GPP TR* 23.852 ("3rd Generation Partnership Project; Technical Specification Group Services and System Aspects; Study on S2a Mobility based On GTP and WLAN access to EPC (SaMOG); Stage 2 (Release 12)", V1.7.0, July 2013); TS 23.401 ("3rd Generation Partnership Project; Technical Specification Group Services and System Aspects; General Packet Radio Service (GPRS) enhancements for Evolved Universal Terrestrial Radio Access Network (E-UTRAN) access (Release 12)", V12.1.0, June 2013); and TS 36.300 ("3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", V12.1.0, June 2013))) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE* 802.11-2012, *IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a radio, which is capable of communicating a wireless communication signal, may include a wireless transmitter to transmit the wireless communication signal to at least one other radio, and/or a wireless communication receiver to receive the wireless communication signal from at least one other radio. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network, e.g., including a cell controlled by a cellular node ("node") 104.

In some demonstrative embodiments, system 100 may include a non-cellular network 107, for example, a WLAN, e.g., a Basic Service Set (BSS), managed by an Access Point (AP) 106.

In some demonstrative embodiments, network 107 may include a trusted WLAN Access network (TWAN), or any other WLAN.

In some demonstrative embodiments, non-cellular network 107 may at least partially be within a coverage area of node 104. For example, AP 106 may be within a coverage area of node 104.

In some demonstrative embodiments, node 104 may include an Evolved Node B (eNB). For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB), a base station or any other node or device.

In some demonstrative embodiments, UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication unit 110 may be implemented in the form of a System on Chip (SoC) including circuitry and/or logic configured to perform the functionality of wireless communication unit 110; and/or wireless communication unit 130 may be implemented in the form of a SoC including circuitry and/or logic configured to perform the functionality of wireless communication unit 130, e.g., as described below.

In some demonstrative embodiments, wireless communication units 110 and 130 may include, or may be associated with, one or more antennas. In one example, wireless communication unit 110 may be associated with at least two antennas, e.g., antennas 112 and 114, or any other number of antennas, e.g., one antenna or more than two antennas; and/or wireless communication unit 130 may be associated with at least two antennas, e.g., antennas 132 and 134, or any other number of antennas, e.g., one antenna or more than two antennas.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114,132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include at least one radio 142 and at least one controller 144 to control communications performed by radio 142, and/or wireless communication unit 110 may include at least one radio 143 and at least one controller 145 to control communications performed by radio 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, at least one radio 143 may include a WLAN transceiver (TRX) 163 to communicate with AP 106 over a WLAN link, and a cellular transceiver 165 to communicate with node 104 over a cellular link.

In some demonstrative embodiments, radio 142 may include a cellular transceiver 167 to communicate with node 104 over the cellular link.

In some demonstrative embodiments, the WLAN link may include, for example, a Wireless Fidelity (WiFi) link, a Wireless Gigabit (WiGig) link, or any other link.

In some demonstrative embodiments, the WLAN link may include, for example, a link over the 2.4 Gigahertz (GHz) or 5 GHz frequency band, the 60 GHz frequency band, or any other frequency band.

In some demonstrative embodiments, radios 142 and/or 143 may include a multiple input multiple output (MIMO) transmitters receivers system (not shown), which may be capable of performing antenna beamforming methods, if desired. In other embodiments, radios 142 and/or 143 may include any other transmitters and/or receivers.

In some demonstrative embodiments, radios 142 and/or 143 may include a turbo decoder and/or a turbo encoder (not shown) for encoding and/or decoding data bits into data symbols, if desired. In other embodiments, radios 142 and/or 143 may include any other encoder and/or decode.

In some demonstrative embodiments, UE 102 may communicate with node 104 via at least one cellular link. For example, radios 142 and/or 143 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104. In other embodiments, radios 142 and/or 143 may include any other modulators and/or demodulators.

In some demonstrative embodiments, wireless communication unit 110 may establish at least one WLAN link with AP 106. For example, wireless communication unit 110 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from AP 106 to the one or more STAs. The uplink may include, for example, a unidirectional link from a STA to AP 106.

In some demonstrative embodiments, UE 102, node 104 and/or AP 106 may also include, for example, one or more of a processor 124, an input unit 116, an output unit 118, a memory unit 120, and a storage unit 122. UE 102, node 104 and/or AP 106 may optionally include other suitable hardware components and/or software components. In some demonstrative embodiments, some or all of the components of one or more of UE 102, node 104 and/or AP 106 may be enclosed in a common housing or packaging, and may be interconnected or operably associated using one or more wired or wireless links. In other embodiments, components of one or more of UE 102, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, Light Emitting Diode (LED) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104 and/or AP 106.

In some demonstrative embodiments, UE 102 may be configured utilize a cellular connection, e.g., a Long Term Evolution (LTE) cellular connection, a Universal Mobile Telecommunications System (UMTS) connection or any other cellular connection, to communicate with node 104; and a WLAN connection, e.g., a Wireless-Fidelity (WiFi) connection or any other WLAN connection, to communicate with AP 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi Radio Access technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In some demonstrative embodiments, node 104 and AP 106 may be implemented as part of a Multi-RAT small cell.

In some demonstrative embodiments, node 104 and AP 106 may be co-located or connected as part of an integrated multi-RAT small cell. In one example, node 104 may be configured to directly interface with AP 106, e.g., to enable node 104 to interact directly with AP 106 and/or to control one or more functionalities of AP 106.

In some embodiments, node 104 and AP 106 may be implemented as part of a single device.

In other embodiments, node 104 and AP 106 may be implemented as separate and/or independent devices.

For example, node 104 and AP 106 may communicate via an interface 171. Interface 171 may include any suitable interface configured to provide connectivity between AP 106 and node 104. Interface 171 may include any wired and/or wireless communication links. In one example, interface 171 may be configured to route and/or tunnel communications between node 104 and AP 106. For example, interface 171 may include an Internet-Protocol (IP) based network, or any other network.

In other embodiments, system 100 may implement any other architecture and/or deployment.

In some demonstrative embodiments, UE 102 may establish a plurality of Evolved Packet-switched System (EPS) bearers to connect between UE 102 and one or more elements of a Core Network (CN) 149 via node 104.

In one example, UE 102 may establish at least one Packet Data Network (PDN) connection between UE 102 and at least one PDN 173, e.g., to support one or more EPS bearers between UE 102 and the PDN 173. The PDN connection may be maintained over a plurality of bearers between UE 102 and the PDN 173.

In one example, system 100 may include an LTE system, and at least one EPS bearer may be established via the PDN connection between UE 102 and a PDN Gateway (GW) (P-GW) 169 of CN 149. The EPS bearer may include a Data Radio Bearer (DRB) between UE 102 and node 104, a S1 bearer between node 104 and a Serving Gateway (S-GW) 167 of CN 149, and a S5 bearer between the S-GW 167 and the P-GW 169. In some implementations, an Evolved UMTS Terrestrial Radio Access Network (E-UTRAN) Radio Access Bearer (E-RAB) may be established between UE 102 and the S-GW 167, e.g., including the DRB and the S1 bearer.

In some demonstrative embodiments, a bearer, e.g., the EPS bearer, may be in the form of a virtual connection, which may provide a bearer service, e.g., a transport service with specific Quality of Service (QoS).

In some demonstrative embodiments, node 104 and UE 102 may be configured to enable cellular-WLAN interworking at the radio access network level, e.g., as described below.

In one example, node 104 and UE 102 may be configured to provide improved traffic balancing between WLAN access of UE 102 and cellular access of UE 102. Additionally or alternatively, node 104 and UE 102 may be configured to enable radio access selection taking into account radio congestion levels, e.g., of the cellular and WLAN links. Additionally or alternatively, node 104 and UE 102 may be configured to provide improved battery life of UE 102, and/or to provide any other improvements and/or benefits.

In some demonstrative embodiments, node 104 and UE 102 may be configured to enable a tightly coupled cellular-WLAN interworking system architecture, e.g., as described below.

In some demonstrative embodiments, node 104 and UE 102 may be configured according to a Multi-Homed Radio Bearer (MHRB) architecture, including a plurality of radio bearer connections ("radio bearer legs") to communicate traffic of a DRB between node 104 and UE 102, e.g., as described below.

In some demonstrative embodiments, the MHRB architecture may include two radio bearer legs, for example, including a first radio bearer leg, which may be established over the cellular link between node 104 and UE 102, and a second radio bearer leg, which may be established over the WLAN link between UE 102 and AP 106, e.g., as described below.

In some demonstrative embodiments, according to the MHRB architecture, the first and second radio bearer legs may be joined together at node 104, for example, in a manner transparent to elements of CN 149, e.g., as described below.

In some demonstrative embodiments, the MHRB architecture may be configured to enable seamless traffic offload between the first and second radio bearer legs, for example, such that packets of an EPS bearer may be steered between the cellular access link and the WLAN access link, e.g., without impacting session continuity.

In some demonstrative embodiments, the radio bearer leg may be established in the form of a point to point (P2P) link between UE 102 and node 104, for example, over the WLAN link between UE 102 and WLAN AP 106, e.g., as described below.

In some demonstrative embodiments, UE 102, node 104, and/or AP 106 may be configured to enable steering one or more DRBs between UE 102 and node 104 via at least one P2P link 139 between UE 102 and node 104, e.g., formed over the WLAN link between UE 102 and AP 106, e.g., as described below.

In some demonstrative embodiments, controller 144 may be configured to establish the at least one P2P link 139 with UE 102 via the WLAN link between UE 102 and WLAN AP 106.

In some demonstrative embodiments, node 104 may provide to UE 102 information corresponding to the at least one P2P link 139, for example, to enable UE 102 to establish the P2P link 139 with node 104, e.g., as described below.

In some demonstrative embodiments, node 104 may provide the information corresponding to the P2P link 139 to UE 102 via one or more Radio Resource Control (RRC) messages, which may be communicated over the cellular link between node 104 and UE 102, e.g., as described below.

In some demonstrative embodiments, cellular TRX 167 may send to UE 102 a RRC message including WLAN identification information to identify WLAN AP 106, and a transport address of node 104. The transport address of node 104 may include, for example, an address of a termination port at node 104 to be used for the P2P link 139, or any other address to be used by node 104 for the P2P link 139.

In some demonstrative embodiments, cellular TRX 165 may receive the RRC message, and controller 145 may establish the P2P link 139 with node 104 based on the WLAN identification information and the transport address.

In some demonstrative embodiments, controllers 144 and 145 may steer the traffic of one or more DRBs from the cellular link between node 104 and UE 102 to the P2P link 139 between node 104 and UE 102, and/or controllers 144 and 145 may steer the traffic of one or more DRBs, which were steered to the P2P link 139, back to the cellular link between node 104 and UE 102, e.g., as described below.

In some demonstrative embodiments, the ability to steer DRBs, e.g., from the cellular link between UE 102 and node 104, via the P2P link 139 over the WLAN link, may enable improved efficiency, bandwidth utilization, steering and/or offloading of traffic between UE 102 and node 104, e.g., as described below.

In some demonstrative embodiments, controllers 144 and 145 may steer the traffic of the DRBs between the cellular link and the P2P link 139, for example, while maintaining session continuity.

In some demonstrative embodiments, node 104 and UE 102 may be configured to offload traffic from the cellular link to the P2P link 139 on a per-bearer basis, e.g., per-EPS bearer, e.g., as described below.

In some demonstrative embodiments, the one or more DRBs between node 104 and UE 102 may include DRBs associated with a plurality of PDN connections between UE 102 and one or more PGWs 169, e.g., as described above.

In some demonstrative embodiments, controllers 144 and 145 may be configured to steer to the P2P link 139 traffic of a first DRB, e.g., a DRB associated with a first PDN connection, while maintaining over the cellular link traffic of a second DRB, e.g., a DRB associated with a second PDN connection.

In some demonstrative embodiments, the selection to steer traffic of one or more DRBs between the cellular link and the P2P link 139 may be made at node 104. For example, controller 144 may select to steer traffic of a DRB ("the node-steered DRB") to the P2P link 139. According to this example, node 104 may send to UE 102 downlink traffic of the node-steered DRB via the P2P link 139.

In some demonstrative embodiments, UE 102 may follow the steering decision made by node 104 with respect to the node-steered DRB. For example, responsive to receiving at UE 102 the downlink traffic of the node-steered DRB via the P2P link 139, controller 145 may steer uplink traffic of the node-steered DRB to P2P link 139, and node 104 may receive the uplink traffic of the node-steered DRB via WLAN AP 106.

Additionally or alternatively, in some demonstrative embodiments, the selection to steer traffic of one or more DRBs between the cellular link and the P2P link 139 may be made at UE 102. For example, controller 145 may select to steer traffic of a DRB ("the UE-steered DRB") to the P2P link 139. According to this example, UE 102 may send to node 104 the uplink traffic of the UE-steered DRB via the P2P link 139.

In some demonstrative embodiments, node 104 may follow the steering decision made by UE 102 with respect to the UE-steered DRB. For example, responsive to receiving at node 104 the uplink traffic of the UE-steered DRB via the P2P link 139, controller 144 may steer downlink traffic of the UE-steered DRB to the P2P link 139, and UE 102 may receive the downlink traffic of the UE-steered DRB via the P2P link 139.

In some demonstrative embodiments, node 104 and UE 102 may establish one or more P2P links 139 corresponding to a plurality of DRBs according to a scheme (MHRB scheme) defining a relationship between the P2P links 139 and the DRBs.

In some demonstrative embodiment, node 104 and UE 102 may establish P2P links 139 according to a first scheme ("the 1:1 scheme"). For example, the 1:1 scheme may include a P2P link (WLAN radio bearer leg) per each DRB. For example, for each DRB to be offloaded from the cellular link between node 104 and 102, node 104 and UE 102 may establish a separate P2P link 139 over the WLAN link between UE 102 and AP 106.

In some demonstrative embodiments, controllers 144 and 145 may establish a plurality of P2P links 139 configured to communicate traffic of respective ones of the plurality of DRBs between node 104 and UE 102.

In some demonstrative embodiments, the 1:1 scheme may enable providing QoS differentiation for traffic sent via WLAN access, e.g., on a per-DRB basis.

In some demonstrative embodiments, node 104 and UE 102 may establish a P2P link 139 configured to communicate traffic of a plurality of DRBs. The P2P link 139 may be established to communicate all DRBs to be offloaded or only some of the DRBs between node 104 and UE 102, e.g., as described below.

In some demonstrative embodiments, node 104 and UE 102 may establish a P2P link 139 according to a second scheme ("all:1 scheme"). For example, the all:1 scheme may include establishing a single P2P link 139 to be used for all DRBs to be offloaded. For example, node 104 and UE 102 may establish a single P2P link over the WLAN link between UE 102 and AP 106 to communicate traffic from DRBs, e.g., DRBs of all PDN connections, between node 104 and UE 102.

In one example, if implementing the all:1 scheme, UE 102 may be configured to associate multiple IP addresses, e.g., one IP address per PDN connection, with the same, single, P2P link 139.

In some demonstrative embodiments, node 104 and UE 102 may establish P2P links 139 according to a third scheme ("PDN:1 scheme"). For example, the PDN:1 scheme may include establishing a P2P link 139 per all DRBs of the same PDN connection. For example, for all DRBs of the same PDN connection, node 104 and UE 102 may establish a separate P2P link 139 over the WLAN link between UE 102 and AP 106.

In some demonstrative embodiments, the PDN:1 scheme may have low complexity, and may avoid using multiple IP addresses for the same P2P link 139.

Figure 2:
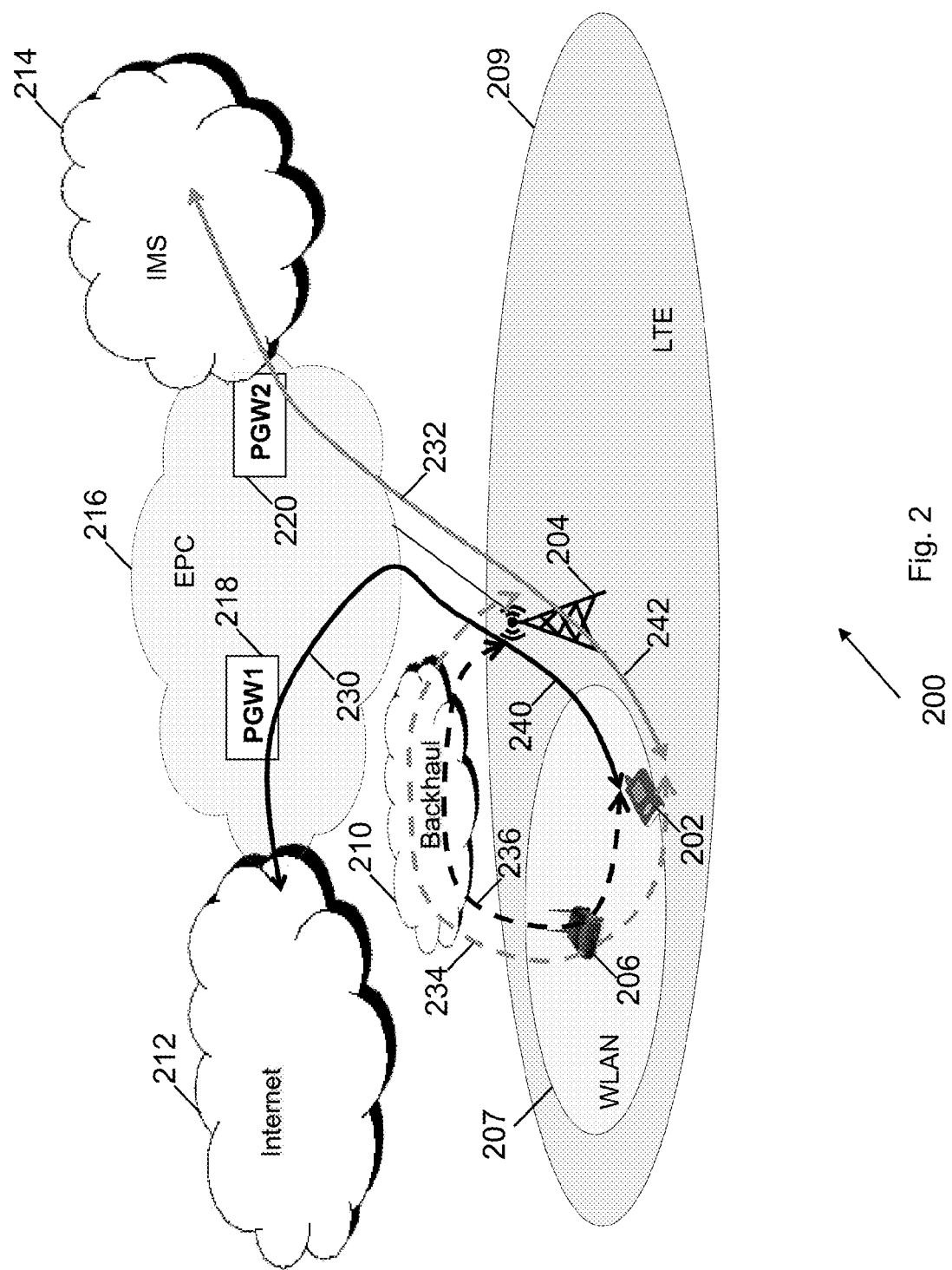
FIG. 2 is a schematic illustration of a deployment of a system, in accordance with some demonstrative embodiments.

Reference is made to FIG. 2, which schematically illustrates a deployment of a system 200, in accordance with some demonstrative embodiments.

In some demonstrative embodiments, system 200 may include an LTE system. For example, system 200 may include a UE 202 configured to communicate with an eNB 204 via cellular link. For example, eNB 204 may have a cellular coverage of an LTE cell 209.

In some demonstrative embodiments, UE 202 may also be configured to communicate with a WLAN AP 206, which may be located within LTE cell 209. For example, WLAN AP 206 may have a WLAN coverage area 207.

In some demonstrative embodiments, UE 202 may perform the functionality of UE 102 (FIG. 1), eNB 204 may perform the functionality of node 104 (FIG. 1), and/or WLAN AP 206 may perform the functionality of WLAN AP 106 (FIG. 1).

In some demonstrative embodiments, UE 202 may establish a first PDN connection 230 with a first PDN 212, e.g., the Internet, via a first EPS bearer between UE 202 and a first PGW ("PGW1") 218 of an Evolved Packet Core (EPC) network 216.

In some demonstrative embodiments, UE 202 may establish a second PDN connection 232 with a second PDN 214, e.g., an IP Multimedia Core Network Subsystem (IMS)

network, via a second EPS bearer between UE 202 and a second PGW ("PGW2") 220 of EPC network 216.

In some demonstrative embodiments, UE 202 may use a first DRB 240, over the cellular link between UE 202 and eNB 204, to communicate Internet traffic of the first PDN connection between UE 202 and EPC 216; and a second DRB 242, over the cellular link between UE 202 and eNB 204, to communicate IMS traffic of the second PDN connection between UE 202 and EPC 216.

In some demonstrative embodiments, eNB 204 and UE 202 may establish a separate "detour" P2P link per each DRB, via the WLAN link between UE 202 and WLAN AP 206, and a backhaul network 210. For example, backhaul network 210 may perform the functionality of interface 171 (FIG. 1).

In some demonstrative embodiments, eNB 204 and UE 202 may establish a first P2P link 236 between eNB 204 and UE 202, via WLAN AP 206.

In some demonstrative embodiments, P2P link 236 may be joined together with DRB 240 at eNB 204, e.g., to form a first MHRB corresponding to the first PDN connection.

In some demonstrative embodiments, eNB 204 and UE 202 may establish a second P2P link 234 between eNB 204 and UE 202, via WLAN AP 206.

In some demonstrative embodiments, P2P link 234 may be joined together with DRB 242 at eNB 204, e.g., to form a second MHRB corresponding to the second PDN connection.

In some demonstrative embodiments, P2P links 234 and/or 236 may perform the functionality of P2P links 139 (FIG. 1).

In some demonstrative embodiments, eNB 204 and/or UE 202 may steer traffic of the first EPS bearer from DRB 240 to P2P link 236, and may steer traffic from P2P link 236 back to DRB 240, for example, without affecting session continuity of a session between UE 202 and network 212, e.g., as described above.

In some demonstrative embodiments, eNB 204 and/or UE 202 may steer traffic of the second EPS bearer from DRB 242 to P2P link 234, and may steer traffic from P2P link 234 back to DRB 242, for example, without affecting session continuity of a session between UE 202 and network 214, e.g., as described above.

In some demonstrative embodiments, P2P links 234 and 236 may provide improved and/or efficient cellular-WLAN offloading and/or steering capabilities, for example, compared to other solutions for enhancing WLAN/3GPP Interworking, e.g., as described below.

In one example, according to a Non-Seamless WLAN Offload (NSWO) architecture, e.g., as described by 3GPP TS 23.402, a UE, which may have two PDN connections, may associate with a WLAN AP, which may be connected to a certain network, e.g., the Internet. The UE may offload certain IP flows of the certain network from the PDN connections to the WLAN AP, which, in turn, may route the IP flows to the certain network.

However, the offloading according to the NSWO architecture may be non-seamless, since the UE may be required to use an IP source address, which may be different from an IP source address of an offloaded IP flow. As a result, every attempt to switch an active IP flow from cellular access to WLAN access will necessarily lead to service disruption.

In addition, the UE of the NSWO architecture may be restricted to offloading IP flows of only some types of networks, e.g., Internet traffic, while not being able to offload IP flows of other types of networks, e.g., IMS traffic, which may not be accessible via the WLAN AP.

In contrast to the deficiencies of the NSWO architecture, P2P links 234 and 236 may enable seamless offload of the traffic of PDN connections 230 and 232 to the WLAN link between WLAN AP 206 and UE 202. For example, the traffic flowing on a DRB between eNB 204 and UE 202 may be freely moved between cellular link and the WLAN link, e.g., without impacting session continuity. In addition, P2P links 234 and 236 may enable steering traffic of PDN connections carrying any type of traffic, for example, since P2P links 234 and 236 enable to route the traffic back to eNB 204, e.g., without imposing on WLAN AP 206 any requirement to be connected to any network.

In another example, according to a Multiple Access Packet Data Network (PDN) Connectivity (MAPCON) architecture, e.g., as described by 3GPP TS 23.402, a UE may establish two PDN connections over two different radio access technologies in parallel. For example, a first PDN connection, e.g., with the Internet, may be entirely established via WLAN access, and a second PDN connection, e.g., with an IMS network, may be entirely established via 3GPP access.

However, the MAPCON architecture is able to provide only an offloading granularity per PDN connection, e.g., since all traffic flowing on a PDN connection may be sent either via WLAN access or via 3GPP access. In addition, switching access with MAPCON architecture requires explicit signaling between the UE and the EPC.

In contrast to the deficiencies of the MAPCON architecture, P2P links 234 and 236 may enable an offloading granularity on a per-bearer basis, e.g., as described above. Additionally, using P2P links 234 and 236 may enable switching access between the WLAN and cellular access links in a dynamic manner, for example, without requiring explicit signaling between the UE and the CN, e.g., as described above.

Figure 3:
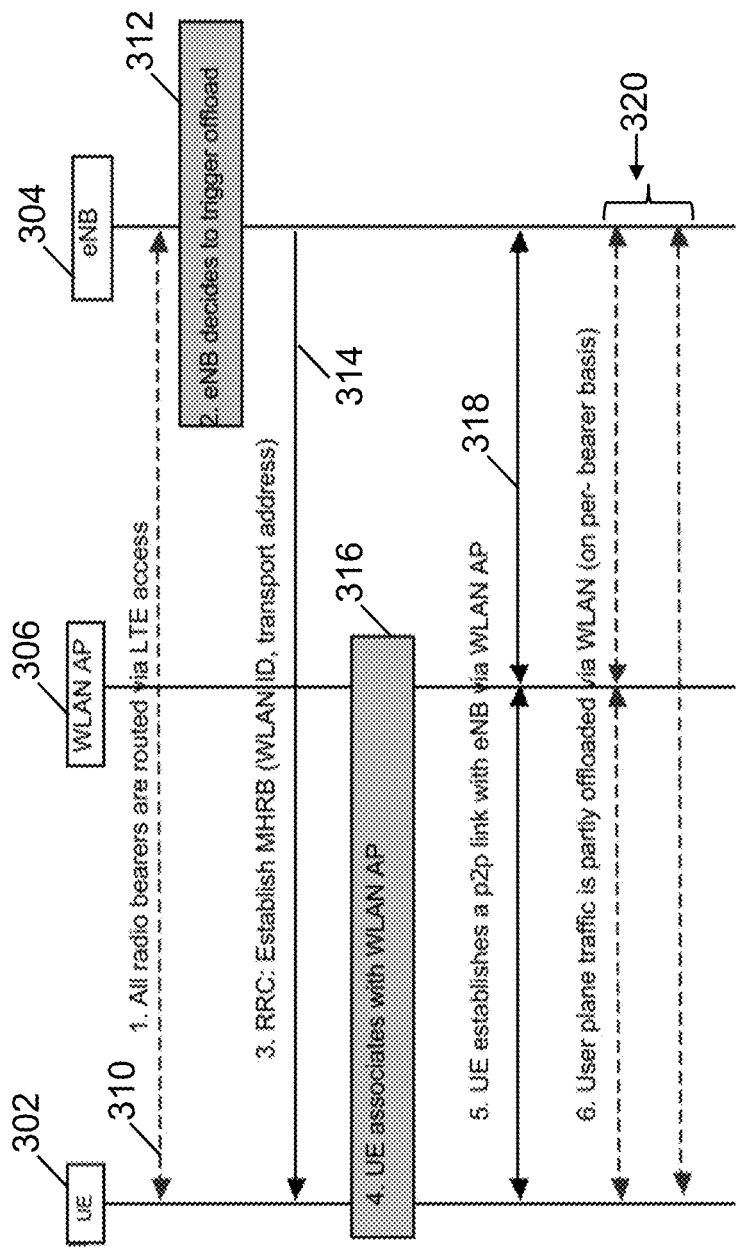
FIG. 3 is a schematic illustration of a sequence diagram of operations performed by a User Equipment (UE), a Wireless Local Area Network (WLAN) Access Point (AP), and an evolved Node B (eNB), in accordance with some demonstrative embodiments.

Reference is made to FIG. 3, which schematically illustrates a sequence diagram of operations performed by a UE 302, a WLAN AP 306, and an eNB 304, in accordance with some demonstrative embodiments. For example, UE 302 may perform the functionality of UE 102 (FIG. 1), WLAN AP 306 may perform the functionality of WLAN AP 106 (FIG. 1), and/or eNB 304 may perform the functionality of node 104 (FIG. 1).

In some demonstrative embodiments, UE 302 and eNB 304 may communicate (310) a plurality of DRBs via LTE access, e.g., via a cellular link between UE 302 and eNB 304.

In some demonstrative embodiments, eNB 304 may decide (312) to trigger offloading of one or more DRBs to one or more P2P links via WLAN AP 306, e.g., using a MHRB scheme.

In some demonstrative embodiments, eNB 304 may decide to trigger the offloading of the one or more DRBs based on any suitable criteria.

In one example, controller 144 (FIG. 1) may make an offloading decision to offload one or more DRBs based, for example, on a location of UE 302, and pre-configured knowledge of appropriate WLAN access points in a vicinity of UE 302.

In another example, the offloading decision may be based on knowledge, at eNB 304, of a real-time load status of WLAN AP 306, a load status of a cell controlled by eNB 304, and/or any other parameter and/or criterion. In one example, eNB 304 may obtain the load status of WLAN AP 306 based, for example, on measurements performed by UE 302, via operations, administration and maintenance (OAM) messages, and/or via a direct interface between eNB 304 and WLAN AP 306.

In some demonstrative embodiments, eNB 304 may select the one or more DRBs to be offloaded, for example, based on a QoS parameter associated with the DRBs.

For example, eNB 304 may select whether or not to offload a DRB from the cellular link to the WLAN link, for example, based on a QoS Class Identifier (QCI) assigned to an EPS bearer associated with the DRB. In one example, eNB 304 may select to offload one or more DRBs, which are associated with EPS bearers having one or more particular QCIs.

In other embodiments, eNB 304 may select the one or more DRBs to be offloaded, based on any other additional or alternative criterion.

In some demonstrative embodiments, eNB 304 may send an RRC message 314, e.g., an Establish MHRB message, to request UE 302 to trigger P2P link establishment via WLAN AP 306.

In some demonstrative embodiments, RRC message 314 may include a WLAN Identifier (ID) to identify WLAN AP 306, e.g., a Service Set ID (SSID) address of WLAN AP 306, a Basic SSID (BSSID) address of WLAN AP 306, or any other address or identifier.

In some demonstrative embodiments, RRC message 314 may include a transport address of eNB 304 to be used as a termination point of a P2P link between eNB 304 and UE 302. The transport address may include, for example, a virtual Media Access Control (MAC) address, a Virtual Local Area Network (VLAN) tag ID, a Generic Routing Encapsulation (GRE) tunnel key, or any other type of address.

In some demonstrative embodiments, UE 302 may search and associate (316) with WLAN AP 306, e.g., based on the WLAN ID in RRC message 314.

In some demonstrative embodiments, UE 302 may trigger establishment (318) of a P2P link, via the WLAN link with WLAN AP 306, to the transport address of eNB 306, e.g., based on the information included in RRC message 314. In one example, UE 320 may establish the P2P link, for example, using enhancements to a WLAN Control Protocol (WLCP), e.g., as defined by 3GPP TS 23.402, or any other signaling protocol.

In some demonstrative embodiments, UE 302 and/or eNB 304 may steer (320) traffic of one or more of the DRBs to the P2P link.

In some demonstrative embodiments, eNB 304 or UE 302 may be in charge of traffic steering, e.g., in charge of selecting the radio access technology on which to forward the traffic of one or more DRB, e.g., as described below.

In some demonstrative embodiments, eNB 304 may start routing downlink traffic of one or more DRBs ("the eNB-steered DRBs") via the WLAN access leg over the P2P link between eNB 304 and UE 302. According to these embodiments, UE 302 may follow the decision of eNB 304 with respect to the eNB-steered DRBs. For example, UE 302 may steer uplink traffic of the eNB-steered DRBs to the WLAN access leg over the P2P link between eNB 304 and UE 302. UE 302 may fall back to LTE access for all traffic, e.g., by continuing to route the uplink traffic of the eNB-steered DRBs on the cellular link and/or by steering the uplink traffic of the eNB-steered DRBs back to the cellular link, for example, if UE 302 realizes that UE 302 is about to exit the WLAN coverage area of WLAN AP 306.

In some demonstrative embodiments, UE 302 may start routing uplink traffic of one or more DRBs ("the UE-steered DRBs) via the WLAN access leg over the P2P link between eNB 304 and UE 302. According to these embodiments, eNB 304 may follow the decision of UE 302 with respect to the UE-steered DRBs. For example, eNB 304 may steer downlink traffic of the UE-steered DRBs to the WLAN access leg over the P2P link between eNB 304 and UE 302. UE 302 may fall back to LTE access for all traffic, e.g., by steering the uplink traffic of the UE-steered DRBs back to the cellular link, for example, if UE 302 realizes that UE 302 is about to exit the WLAN coverage area of WLAN AP 306.

In some demonstrative embodiments, the MHRB scheme between UE 302 and eNB 304 may be implicitly released, for example, if UE 302 is handed over from eNB 304 to another LTE cell. For example, UE may be aware of the implicit MHRB release, e.g., upon receiving a HANDOVER COMMAND message to indicate UE 302 is being handed over to another cell. Accordingly, UE 302 may establish a new MHRB with an eNB of the new cell.

Figure 4:
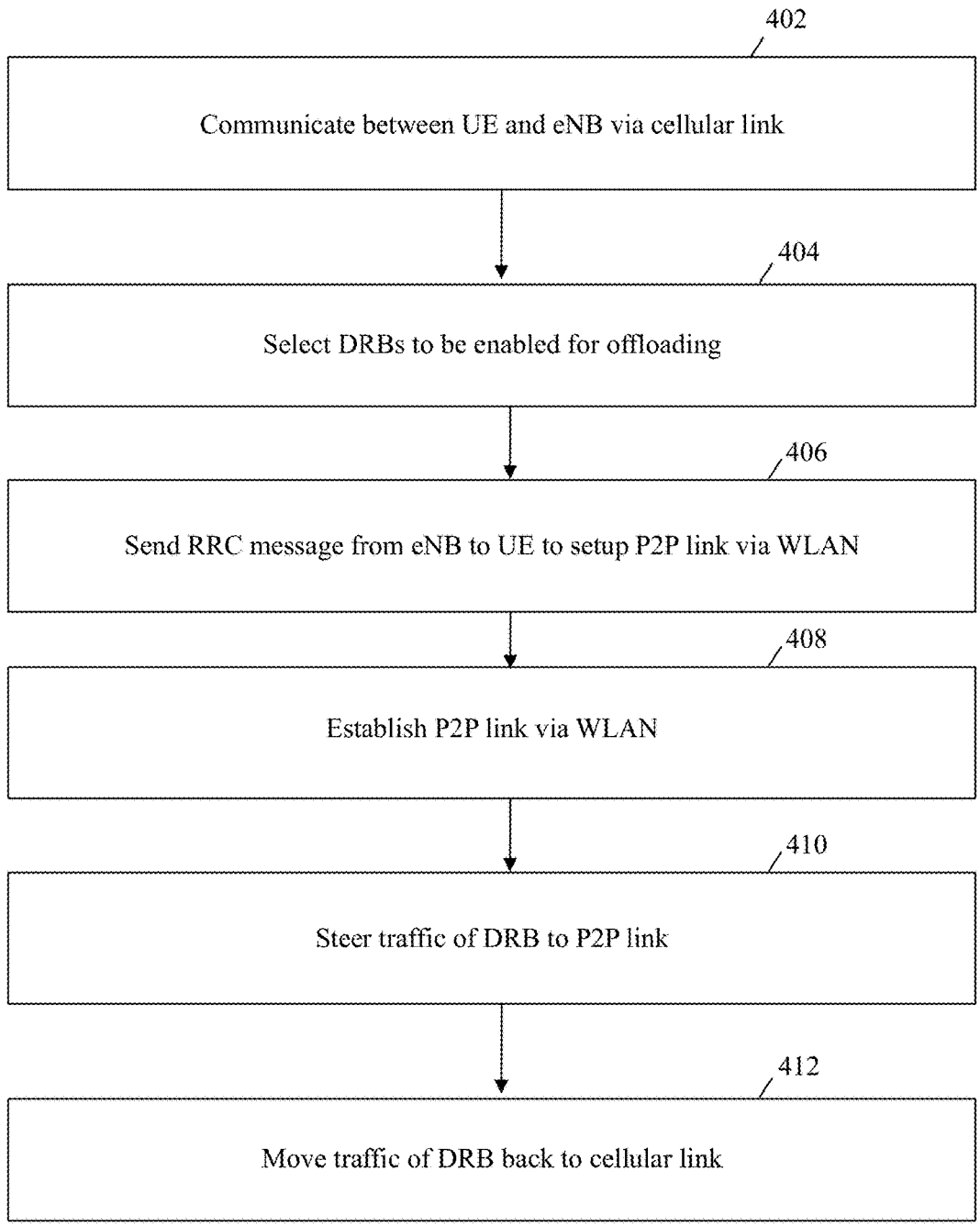
FIG. 4 is a schematic illustration of a method of steering Data Radio Bearer (DRB) traffic to a WLAN link, in accordance with some demonstrative embodiments.

Reference is made to FIG. 4, which schematically illustrates a method of steering DRB traffic to a WLAN link, in accordance with some demonstrative embodiments. In some embodiments, one or more of the operations of the method of FIG. 4 may be performed by a wireless communication system e.g., system 100 (FIG. 1) or system 200 (FIG. 2); a wireless communication device, e.g., UE 102 (FIG. 1), node 104 (FIG. 1) and/or AP 106 (FIG. 1); and/or a wireless communication unit, e.g., wireless communication units 110 and/or 130 (FIG. 1).

As indicated at block 402, the method may include communicating between a UE and a node traffic of a plurality of DRBs via a cellular link between the node and the UE. For example, node 104 (FIG. 1) and UE 102 (FIG. 1) may route traffic of a plurality of DRBs via a cellular link between UE 102 (FIG. 1) and node 104 (FIG. 1), e.g., as described above.

As indicated at block 404, the method may include selecting one or more DRBs to be enabled for offloading to a WLAN link. For example, node 104 (FIG. 1) may select one or more DRBs to be enabled for offloading to one or more P2P links 139 (FIG. 1), e.g., as described above.

As indicated at block 406, the method may include communicating a RRC message from the node to the UE, the RRC message including WLAN identification information to identify a WLAN AP, and a transport address of the node. For example, node 104 (FIG. 1) may transmit to UE 102 (FIG. 1) an RRC message including WLAN identification information corresponding to WLAN AP 106 (FIG. 1), and a transport address of node 104 (FIG. 1), e.g., as described above.

As indicated at block 408, the method may include establishing at least one P2P link between the node and the UE, via a WLAN link between the UE and the WLAN AP. For example, UE 102 (FIG. 1) and node 104 (FIG. 1) may establish at least one P2P link 139 (FIG. 1), e.g., as described above.

As indicated at block 410, the method may include steering traffic of one or more of the DRBs ("the steered DRBs") to the cellular link to the P2P link. In one example, node 104 (FIG. 1) may steer downlink traffic of one or more DRBs to P2P link 139 (FIG. 1), e.g., as described above. In another example, UE 102 (FIG. 1) may steer uplink traffic of one or more DRBs to P2P link 139 (FIG. 1), e.g., as described above.

As indicated at block 412, the method may include moving traffic of one or more of the steered DRBs back to the cellular link. For example, node 104 (FIG. 1) may move a steered DRB back to the cellular link, and/or UE 102 (FIG. 1) may move a steered DRB back to the cellular link, e.g., as described above.

Figure 5:
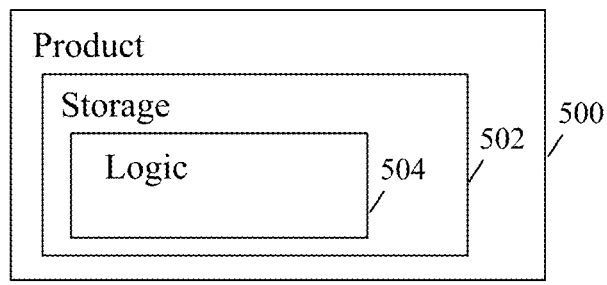
FIG. 5 is a schematic illustration of a product, in accordance with some demonstrative embodiments.

FIG. 5 is a schematic illustration of a product of manufacture, in accordance with some demonstrative embodiments. Product 500 may include a non-transitory machine-readable storage medium 502 to store logic 504, which may be used, for example, to perform at least part of the functionality of UE 102 (FIG. 1), node 104 (FIG. 1), AP 106 (FIG. 1), wireless communication unit 110 (FIG. 1), wireless communication unit 130 (FIG. 1), controller 144 (FIG. 1), and/or controller 145 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a Wireless Local Area Network (WLAN) transceiver; a cellular transceiver to communicate traffic of a plurality of Data Radio Bearers (DRBs) via a cellular link between the UE and an evolved Node B (eNB); and a controller to establish at least one Point-to-Point (P2P) link with the eNB via a WLAN link between the UE and a WLAN Access Point (AP), and to steer traffic of one or more of the DRBs from the cellular link to the P2P link.

Example 2 includes the subject matter of Example 1, and optionally, wherein the cellular transceiver is to receive from the eNB a Radio Resource Control (RRC) message including WLAN identification information to identify the WLAN AP, and a transport address of the eNB, the controller is to establish the P2P link based on the WLAN identification information and the transport address.

Example 3 includes the subject matter of Example 1 or 2, and optionally, wherein, responsive to receiving at the UE downlink traffic of a DRB of the plurality of DRBs via the P2P link, the controller is to steer to the P2P link uplink traffic of the DRB.

Example 4 includes the subject matter of any one of Examples 1-3, and optionally, wherein the controller is to select to steer to the P2P link uplink traffic of a DRB of the plurality of DRBs, and, responsive to steering the uplink traffic to the P2P link, the UE is to receive from the eNB downlink traffic of the DRB via the P2P link.

Example 5 includes the subject matter of any one of Examples 1-4, and optionally, wherein the controller is to establish a plurality of P2P links configured to communicate traffic of respective ones of the plurality of DRBs.

Example 6 includes the subject matter of any one of Examples 1-4, and optionally, wherein the controller is to establish a single P2P link configured to communicate traffic of the plurality of DRBs.

Example 7 includes the subject matter of any one of Examples 1-6, and optionally, wherein the controller is to steer the traffic of the DRBs from the cellular link to the P2P link while maintaining session continuity.

Example 8 includes the subject matter of any one of Examples 1-7, and optionally, wherein the plurality of DRBs is associated with one or more Packet Data network (PDN) connections between the UE and one or more PDN Gateways (PGWs).

Example 9 includes the subject matter of Example 8, and optionally, wherein the plurality of DRBs include first and second DRBs associated with a PDN connection, and wherein the controller is to steer traffic of the first DRB to the P2P link, while maintaining traffic of the second DRB over the cellular link.

Example 10 includes the subject matter of any one of Examples 1-9, and optionally, wherein the plurality of DRBs are associated with a plurality of Evolved Packet switched System (EPS) bearers.

Example 11 includes the subject matter of any one of Examples 1-10, and optionally, comprising one or more antennas, a memory and a processor.

Example 12 includes an evolved Node B (eNB) comprising a cellular transceiver to communicate with a User Equipment (UE) via a cellular link; and a controller to trigger offloading of one or more Data Radio Bearers (DRBs) to at least one Point to Point (P2P) link between the eNB and the UE, the P2P link being via a Wireless Local Area Network (WLAN) link between the UE and a WLAN access Point (AP), the cellular transceiver is to send to the UE a Radio Resource Control (RRC) message including WLAN identification information to identify the WLAN AP, and a transport address of the eNB.

Example 13 includes the subject matter of Example 12, and optionally, wherein the controller is to select to steer traffic of a DRB of the one or more DRBs to the P2P link, and the eNB is to send to the UE downlink traffic of the DRB via the P2P link.

Example 14 includes the subject matter of Example 12 or 13, and optionally, wherein, responsive to receiving at the eNB uplink traffic of a DRB of the one or more DRBs via the P2P link, the controller is to steer downlink traffic of the DRB to the P2P link.

Example 15 includes the subject matter of any one of Examples 12-14, and optionally, wherein the controller is to establish a plurality of P2P links configured to communicate traffic of respective ones of the plurality of DRBs.

Example 16 includes the subject matter of any one of Examples 12-14, and optionally, wherein the controller is to establish a single P2P link configured to communicate traffic of the plurality of DRBs.

Example 17 includes the subject matter of any one of Examples 12-16, and optionally, wherein the controller is to steer the traffic of the DRBs from the cellular link to the P2P link while maintaining session continuity.

Example 18 includes the subject matter of any one of Examples 12-17, and optionally, wherein the one or more DRBs are associated with one or more Packet Data network (PDN) connections between the UE and one or more PDN Gateways (PGWs).

Example 19 includes the subject matter of Example 18, and optionally, wherein the one or more DRBs include first and second DRBs over a PDN connection, and wherein the controller is to steer traffic of the first DRB to the P2P link, while maintaining traffic of the second DRB over the cellular link.

Example 20 includes the subject matter of any one of Examples 12-19, and optionally, wherein the one or more DRBs are associated with one or more Evolved Packet switched System (EPS) bearers.

Example 21 includes the subject matter of any one of Examples 12-20, and optionally, comprising one or more antennas, a memory, and a processor.

Example 22 includes a method performed at a User Equipment (UE), the method comprising routing traffic of a plurality of Data Radio Bearers (DRBs) via a cellular link between the UE and an evolved Node B (eNB); receiving from the eNB a Radio Resource Control (RRC) message including Wireless Local Are Network (WLAN) identification information to identify a WLAN Access Point (AP), and a transport address of the eNB; establishing at least one Point-to-Point (P2P) link with the eNB via a WLAN link between the UE and the WLAN AP; and steering traffic of one or more of the DRBs from the cellular link to the P2P link.

Example 23 includes the subject matter of Example 22, and optionally, comprising receiving at the UE downlink traffic of a DRB of the plurality of DRBs via the P2P link, and steering to the P2P link uplink traffic of the DRB.

Example 24 includes the subject matter of Example 22 or 23, and optionally, comprising selecting to steer to the P2P link uplink traffic of a DRB of the plurality of DRBs, and receiving from the eNB downlink traffic of the DRB via the P2P link.

Example 25 includes the subject matter of any one of Examples 22-24, and optionally, comprising establishing a plurality of P2P links configured to communicate traffic of respective ones of the plurality of DRBs.

Example 26 includes the subject matter of any one of Examples 22-24, and optionally, comprising establishing a single P2P link configured to communicate traffic of the plurality of DRBs.

Example 27 includes the subject matter of any one of Examples 22-26, and optionally, comprising moving a DRB, which was steered to the P2P link, back to the cellular link.

Example 28 includes the subject matter of any one of Examples 22-27, and optionally, comprising steering the traffic of the DRBs from the cellular link to the P2P link while maintaining session continuity.

Example 29 includes the subject matter of any one of Examples 22-28, and optionally, wherein the plurality of DRBs is associated with one or more Packet Data network (PDN) connections between the UE and one or more PDN Gateways (PGWs).

Example 30 includes the subject matter of Example 29, and optionally, wherein the plurality of DRBs include first and second DRBs associated with a PDN connection, the steering comprises steering traffic of the first DRB to the P2P link, while maintaining traffic of the second DRB over the cellular link.

Example 31 includes the subject matter of any one of Examples 22-30, and optionally, wherein the plurality of DRBs are associated with a plurality of Evolved Packet switched System (EPS) bearers.

Example 32 includes a method performed at an evolved Node B (eNB), the method comprising communicating with a User Equipment (UE) via a cellular link; sending to the UE a Radio Resource Control (RRC) message including Wireless Local Area Network (WLAN) identification information to identify a WLAN Access Point (AP), and a transport address of the eNB; establishing at least one Point-to-Point (P2P) link with the UE via the WLAN AP; and steering traffic of one or more Data Radio Bearers (DRBs) from the cellular link to the P2P link.

Example 33 includes the subject matter of Example 32, and optionally, comprising selecting to steer traffic of a DRB of the one or more DRBs to the P2P link, and sending to the UE downlink traffic of the DRB via the P2P link.

Example 34 includes the subject matter of 32 or 33, and optionally, comprising, responsive to receiving at the eNB uplink traffic of a DRB of the one or more DRBs via the P2P link, steering downlink traffic of the DRB to the P2P link.

Example 35 includes the subject matter of any one of Examples 32-34, and optionally, comprising establishing a plurality of P2P links configured to communicate traffic of respective ones of the plurality of DRBs.

Example 36 includes the subject matter of any one of Examples 32-34, and optionally, comprising establishing a single P2P link configured to communicate traffic of the plurality of DRBs.

Example 37 includes the subject matter of any one of Examples 32-36, and optionally, comprising steering the traffic of the DRBs from the cellular link to the P2P link while maintaining session continuity.

Example 38 includes the subject matter of any one of Examples 32-37, and optionally, wherein the one or more DRBs are associated with one or more Packet Data network (PDN) connections between the UE and one or more PDN Gateways (PGWs).

Example 39 includes the subject matter of Example 38, and optionally, wherein the one or more DRBs include first and second DRBs over a PDN connection, the steering comprising steering traffic of the first DRB to the P2P link, while maintaining traffic of the second DRB over the cellular link.

Example 40 includes the subject matter of any one of Examples 32-39, and optionally, comprising moving a DRB, which was steered to the P2P link, back to the cellular link.

Example 41 includes the subject matter of any one of Examples 32-40, and optionally, wherein the one or more DRBs are associated with one or more Evolved Packet switched System (EPS) bearers.

Example 42 includes a method performed at an evolved Node B (eNB), the method comprising communicating with a User Equipment (UE) via a cellular link; establishing with the UE a Multi-Homed-Radio-Bearer (MHRB), the MHRB including a cellular radio bearer over the cellular link and a Point to Point (P2P) link via a Wireless Local Area Network (WLAN) radio bearer; and steering traffic of one or more Data Radio Bearers (DRBs) from the cellular radio bearer to the P2P link.

Example 43 includes the subject matter of Example 42, and optionally, comprising sending to the UE a Radio Resource Control (RRC) message including WLAN identification information to identify a WLAN Access Point (AP), and a transport address of the eNB; and establishing the P2P link with the UE via the WLAN AP.

Example 44 includes the subject matter of Example 42 or 43, and optionally, comprising selecting to steer traffic of a DRB of the one or more DRBs to the P2P link, and sending to the UE downlink traffic of the DRB via the P2P link.

Example 45 includes the subject matter of any one of Examples 42-44, and optionally, comprising, responsive to receiving at the eNB uplink traffic of a DRB of the one or more DRBs via the P2P link, steering downlink traffic of the DRB to the P2P link.

Example 46 includes the subject matter of any one of Examples 42-45, and optionally, comprising establishing a plurality of P2P links configured to communicate traffic of respective ones of the plurality of DRBs.

Example 47 includes the subject matter of any one of Examples 42-45, and optionally, comprising establishing a single P2P link configured to communicate traffic of the plurality of DRBs.

Example 48 includes the subject matter of any one of Examples 42-47, and optionally, comprising steering the traffic of the DRBs from the cellular radio bearer to the P2P link while maintaining session continuity.

Example 49 includes the subject matter of any one of Examples 42-48, and optionally, wherein the one or more DRBs are associated with one or more Packet Data network (PDN) connections between the UE and one or more PDN Gateways (PGWs).

Example 50 includes the subject matter of Example 49, and optionally, wherein the one or more DRBs include first and second DRBs over a PDN connection, the steering comprising steering traffic of the first DRB to the P2P link, while maintaining traffic of the second DRB over the cellular radio bearer.

Example 51 includes the subject matter of any one of Examples 42-50, and optionally, comprising moving a DRB, which was steered to the P2P link, back to the cellular radio bearer.

Example 52 includes the subject matter of any one of Examples 42-51, and optionally, wherein the one or more DRBs are associated with one or more Evolved Packet switched System (EPS) bearers.

Example 53 includes a product including one or more tangible computer-readable non-transitory storage media comprising computer-executable instructions operable to, when executed by at least one computer processor, enable the at least one computer processor to implement at a User Equipment (UE) a method comprising routing traffic of a plurality of Data Radio Bearers (DRBs) via a cellular link between the UE and an evolved Node B (eNB); receiving from the eNB a Radio Resource Control (RRC) message including Wireless Local Are Network (WLAN) identification information to identify a WLAN Access Point (AP), and a transport address of the eNB; establishing at least one Point-to-Point (P2P) link with the eNB via a WLAN link between the UE and the WLAN AP; and steering traffic of one or more of the DRBs from the cellular link to the P2P link.

Example 54 includes the subject matter of Example 53, and optionally, wherein the method comprises receiving at the UE downlink traffic of a DRB of the plurality of DRBs via the P2P link, and steering to the P2P link uplink traffic of the DRB.

Example 55 includes the subject matter of Example 53 or 54, and optionally, wherein the method comprises selecting to steer to the P2P link uplink traffic of a DRB of the plurality of DRBs, and receiving from the eNB downlink traffic of the DRB via the P2P link.

Example 56 includes the subject matter of any one of Examples 53-55, and optionally, wherein the method comprises establishing a plurality of P2P links configured to communicate traffic of respective ones of the plurality of DRBs.

Example 57 includes the subject matter of any one of Examples 53-55, and optionally, wherein the method comprises establishing a single P2P link configured to communicate traffic of the plurality of DRBs.

Example 58 includes the subject matter of any one of Examples 53-57, and optionally, wherein the method comprises moving a DRB, which was steered to the P2P link, back to the cellular link.

Example 59 includes the subject matter of any one of Examples 53-58, and optionally, wherein the method comprises steering the traffic of the DRBs from the cellular link to the P2P link while maintaining session continuity.

Example 60 includes the subject matter of any one of Examples 53-59, and optionally, wherein the plurality of DRBs is associated with one or more Packet Data network (PDN) connections between the UE and one or more PDN Gateways (PGWs).

Example 61 includes the subject matter of Example 60, and optionally, wherein the plurality of DRBs include first and second DRBs associated with a PDN connection, the steering comprises steering traffic of the first DRB to the P2P link, while maintaining traffic of the second DRB over the cellular link.

Example 62 includes the subject matter of any one of Examples 53-61, and optionally, wherein the plurality of DRBs are associated with a plurality of Evolved Packet switched System (EPS) bearers.

Example 63 includes a product including one or more tangible computer-readable non-transitory storage media comprising computer-executable instructions operable to, when executed by at least one computer processor, enable the at least one computer processor to implement at an evolved Node B (eNB) a method comprising communicating with a User Equipment (UE) via a cellular link; sending to the UE a Radio Resource Control (RRC) message including Wireless Local Area Network (WLAN) identification information to identify a WLAN Access Point (AP), and a transport address of the eNB; establishing at least one Point-to-Point (P2P) link with the UE via the WLAN AP; and steering traffic of one or more Data Radio Bearers (DRBs) from the cellular link to the P2P link.

Example 64 includes the subject matter of Example 63, and optionally, wherein the method comprises selecting to steer traffic of a DRB of the one or more DRBs to the P2P link, and sending to the UE downlink traffic of the DRB via the P2P link.

Example 65 includes the subject matter of 63 or 64, and optionally, wherein the method comprises, responsive to receiving at the eNB uplink traffic of a DRB of the one or more DRBs via the P2P link, steering downlink traffic of the DRB to the P2P link.

Example 66 includes the subject matter of any one of Examples 63-65, and optionally, wherein the method comprises establishing a plurality of P2P links configured to communicate traffic of respective ones of the plurality of DRBs.

Example 67 includes the subject matter of any one of Examples 63-65, and optionally, wherein the method comprises establishing a single P2P link configured to communicate traffic of the plurality of DRBs.

Example 68 includes the subject matter of any one of Examples 63-67, and optionally, wherein the method comprises steering the traffic of the DRBs from the cellular link to the P2P link while maintaining session continuity.

Example 69 includes the subject matter of any one of Examples 63-68, and optionally, wherein the one or more DRBs are associated with one or more Packet Data network (PDN) connections between the UE and one or more PDN Gateways (PGWs).

Example 70 includes the subject matter of Example 69, and optionally, wherein the one or more DRBs include first and second DRBs over a PDN connection, the steering comprising steering traffic of the first DRB to the P2P link, while maintaining traffic of the second DRB over the cellular link.

Example 71 includes the subject matter of any one of Examples 63-70, and optionally, wherein the method comprises moving a DRB, which was steered to the P2P link, back to the cellular link.

Example 72 includes the subject matter of any one of Examples 63-71, and optionally, wherein the one or more DRBs are associated with one or more Evolved Packet switched System (EPS) bearers.

Example 73 includes a product including one or more tangible computer-readable non-transitory storage media comprising computer-executable instructions operable to, when executed by at least one computer processor, enable the at least one computer processor to implement at an evolved Node B (eNB) a method comprising communicating with a User Equipment (UE) via a cellular link; establishing with the UE a Multi-Homed-Radio-Bearer (MHRB), the MHRB including a cellular radio bearer over the cellular link and a Point to Point (P2P) link via a Wireless Local Area Network (WLAN) radio bearer; and steering traffic of one or more Data Radio Bearers (DRBs) from the cellular radio bearer to the P2P link.

Example 74 includes the subject matter of Example 73, and optionally, wherein the method comprises sending to the UE a Radio Resource Control (RRC) message including WLAN identification information to identify a WLAN Access Point (AP), and a transport address of the eNB; and establishing the P2P link with the UE via the WLAN AP.

Example 75 includes the subject matter of Example 73 or 74, and optionally, wherein the method comprises selecting to steer traffic of a DRB of the one or more DRBs to the P2P link, and sending to the UE downlink traffic of the DRB via the P2P link.

Example 76 includes the subject matter of any one of Examples 73-75, and optionally, wherein the method comprises, responsive to receiving at the eNB uplink traffic of a DRB of the one or more DRBs via the P2P link, steering downlink traffic of the DRB to the P2P link.

Example 77 includes the subject matter of any one of Examples 73-76, and optionally, wherein the method comprises establishing a plurality of P2P links configured to communicate traffic of respective ones of the plurality of DRBs.

Example 78 includes the subject matter of any one of Examples 73-76, and optionally, wherein the method comprises establishing a single P2P link configured to communicate traffic of the plurality of DRBs.

Example 79 includes the subject matter of any one of Examples 73-78, and optionally, wherein the method comprises steering the traffic of the DRBs from the cellular radio bearer to the P2P link while maintaining session continuity.

Example 80 includes the subject matter of any one of Examples 73-79, and optionally, wherein the one or more DRBs are associated with one or more Packet Data network (PDN) connections between the UE and one or more PDN Gateways (PGWs).

Example 81 includes the subject matter of Example 80, and optionally, wherein the one or more DRBs include first and second DRBs over a PDN connection, the steering comprising steering traffic of the first DRB to the P2P link, while maintaining traffic of the second DRB over the cellular radio bearer.

Example 82 includes the subject matter of any one of Examples 73-81, and optionally, wherein the method comprises moving a DRB, which was steered to the P2P link, back to the cellular radio bearer.

Example 83 includes the subject matter of any one of Examples 73-82, and optionally, wherein the one or more DRBs are associated with one or more Evolved Packet switched System (EPS) bearers.

Example 84 includes an apparatus comprising means for routing traffic of a plurality of Data Radio Bearers (DRBs) via a cellular link between a User Equipment (UE) and an evolved Node B (eNB); means for receiving from the eNB a Radio Resource Control (RRC) message including Wireless Local Are Network (WLAN) identification information to identify a WLAN Access Point (AP), and a transport address of the eNB; means for establishing at least one Point-to-Point (P2P) link with the eNB via a WLAN link between the UE and the WLAN AP; and means for steering traffic of one or more of the DRBs from the cellular link to the P2P link.

Example 85 includes the subject matter of Example 84, and optionally, comprising means for receiving at the UE downlink traffic of a DRB of the plurality of DRBs via the P2P link, and steering to the P2P link uplink traffic of the DRB.

Example 86 includes the subject matter of Example 84 or 85, and optionally, comprising means for selecting to steer to the P2P link uplink traffic of a DRB of the plurality of DRBs, and receiving from the eNB downlink traffic of the DRB via the P2P link.

Example 87 includes the subject matter of any one of Examples 84-86, and optionally, comprising means for establishing a plurality of P2P links configured to communicate traffic of respective ones of the plurality of DRBs.

Example 88 includes the subject matter of any one of Examples 84-86, and optionally, comprising means for establishing a single P2P link configured to communicate traffic of the plurality of DRBs.

Example 89 includes the subject matter of any one of Examples 84-88, and optionally, comprising means for moving a DRB, which was steered to the P2P link, back to the cellular link.

Example 90 includes the subject matter of any one of Examples 84-89, and optionally, comprising means for steering the traffic of the DRBs from the cellular link to the P2P link while maintaining session continuity.

Example 91 includes the subject matter of any one of Examples 84-90, and optionally, wherein the plurality of DRBs is associated with one or more Packet Data network (PDN) connections between the UE and one or more PDN Gateways (PGWs).

Example 92 includes the subject matter of Example 91, and optionally, wherein the plurality of DRBs include first and second DRBs associated with a PDN connection, the steering comprises steering traffic of the first DRB to the P2P link, while maintaining traffic of the second DRB over the cellular link.

Example 93 includes the subject matter of any one of Examples 84-92, and optionally, wherein the plurality of DRBs are associated with a plurality of Evolved Packet switched System (EPS) bearers.

Example 94 includes an apparatus comprising means for, at an Evolved Node B (eNB), communicating with a User Equipment (UE) via a cellular link; means for sending to the UE a Radio Resource Control (RRC) message including Wireless Local Area Network (WLAN) identification information to identify a WLAN Access Point (AP), and a transport address of the eNB; means for establishing at least one Point-to-Point (P2P) link with the UE via the WLAN AP; and means for steering traffic of one or more Data Radio Bearers (DRBs) from the cellular link to the P2P link.

Example 95 includes the subject matter of Example 94, and optionally, comprising means for selecting to steer traffic of a DRB of the one or more DRBs to the P2P link, and sending to the UE downlink traffic of the DRB via the P2P link.

Example 96 includes the subject matter of 94 or 95, and optionally, comprising means for, responsive to receiving at the eNB uplink traffic of a DRB of the one or more DRBs via the P2P link, steering downlink traffic of the DRB to the P2P link.

Example 97 includes the subject matter of any one of Examples 94-96, and optionally, comprising means for establishing a plurality of P2P links configured to communicate traffic of respective ones of the plurality of DRBs.

Example 98 includes the subject matter of any one of Examples 94-96, and optionally, comprising means for establishing a single P2P link configured to communicate traffic of the plurality of DRBs.

Example 99 includes the subject matter of any one of Examples 94-98, and optionally, comprising means for steering the traffic of the DRBs from the cellular link to the P2P link while maintaining session continuity.

Example 100 includes the subject matter of any one of Examples 90-99, and optionally, wherein the one or more DRBs are associated with one or more Packet Data network (PDN) connections between the UE and one or more PDN Gateways (PGWs).

Example 101 includes the subject matter of Example 100, and optionally, wherein the one or more DRBs include first and second DRBs over a PDN connection, the steering comprising steering traffic of the first DRB to the P2P link, while maintaining traffic of the second DRB over the cellular link.

Example 102 includes the subject matter of any one of Examples 94-101, and optionally, comprising means for moving a DRB, which was steered to the P2P link, back to the cellular link.

Example 103 includes the subject matter of any one of Examples 94-102, and optionally, wherein the one or more DRBs are associated with one or more Evolved Packet switched System (EPS) bearers.

Example 104 includes an apparatus comprising means for, at an Evolved Node B (eNB), communicating with a User Equipment (UE) via a cellular link; means for establishing with the UE a Multi-Homed-Radio-Bearer (MHRB), the MHRB including a cellular radio bearer over the cellular link and a Point to Point (P2P) link via a Wireless Local Area Network (WLAN) radio bearer; and means for steering traffic of one or more Data Radio Bearers (DRBs) from the cellular radio bearer to the P2P link.

Example 105 includes the subject matter of Example 104, and optionally, comprising means for sending to the UE a Radio Resource Control (RRC) message including WLAN identification information to identify a WLAN Access Point (AP), and a transport address of the eNB; and establishing the P2P link with the UE via the WLAN AP.

Example 106 includes the subject matter of Example 104 or 105, and optionally, comprising means for selecting to steer traffic of a DRB of the one or more DRBs to the P2P link, and sending to the UE downlink traffic of the DRB via the P2P link.

Example 107 includes the subject matter of any one of Examples 104-106, and optionally, comprising means for, responsive to receiving at the eNB uplink traffic of a DRB of the one or more DRBs via the P2P link, steering downlink traffic of the DRB to the P2P link.

Example 108 includes the subject matter of any one of Examples 104-107, and optionally, comprising means for establishing a plurality of P2P links configured to communicate traffic of respective ones of the plurality of DRBs.

Example 109 includes the subject matter of any one of Examples 104-107, and optionally, comprising means for establishing a single P2P link configured to communicate traffic of the plurality of DRBs.

Example 110 includes the subject matter of any one of Examples 104-109, and optionally, comprising means for steering the traffic of the DRBs from the cellular radio bearer to the P2P link while maintaining session continuity.

Example 111 includes the subject matter of any one of Examples 104-110, and optionally, wherein the one or more DRBs are associated with one or more Packet Data network (PDN) connections between the UE and one or more PDN Gateways (PGWs).

Example 112 includes the subject matter of Example 111, and optionally, wherein the one or more DRBs include first and second DRBs over a PDN connection, the steering comprising steering traffic of the first DRB to the P2P link, while maintaining traffic of the second DRB over the cellular radio bearer.

Example 113 includes the subject matter of any one of Examples 104-112, and optionally, comprising means for moving a DRB, which was steered to the P2P link, back to the cellular radio bearer.

Example 114 includes the subject matter of any one of Examples 104-113, and optionally, wherein the one or more DRBs are associated with one or more Evolved Packet switched System (EPS) bearers.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A User Equipment (UE) comprising:
a Wireless Local Area Network (WLAN) transceiver;
a cellular transceiver to communicate traffic of a plurality of Data Radio Bearers (DRBs) via a cellular link between the UE and an evolved Node B (eNB); and
a controller to establish at least one Point-to-Point (P2P) link with said eNB via a WLAN link between said UE and a WLAN Access Point (AP), and to steer traffic of one or more of said plurality of DRBs from said cellular link to said P2P link, the controller to establish the at least one P2P link on a per Packet Data network (PDN) connection basis by determining a count of the at least one P2P link based at least on a count of different Packet Data network (PDN) connections associated with the plurality of DRBs, the controller to establish one or more first P2P links with said eNB via the WLAN AP to communicate traffic of one or more first DRBs of a first PDN connection with a first PDN Gateway (PGW), and to establish one or more second P2P links with said eNB via the WLAN AP, concurrent with the one or more first P2P links, to communicate traffic of one or more second DRBs of a second PDN connection with a second PGW.

2. The UE of claim 1, wherein said cellular transceiver is to receive from said eNB a Radio Resource Control (RRC) message including WLAN identification information to identify said WLAN AP, and a transport address of said eNB, said controller is to establish said at least one P2P link based on said WLAN identification information and said transport address.

3. The UE of claim 1, wherein, responsive to receiving at said UE downlink traffic of a DRB of said plurality of DRBs via a P2P link corresponding to the DRB, said controller is to steer to said P2P link corresponding to the DRB uplink traffic of said DRB.

4. The UE of claim 1, wherein said controller is to select to steer to said P2P link uplink traffic of a DRB of said plurality of DRBs, and, responsive to steering said uplink traffic to said P2P link, said UE is to receive from said eNB downlink traffic of said DRB via said P2P link.

5. The UE of claim 1, wherein said controller is to establish a plurality of first P2P links configured to communicate traffic of respective ones of a plurality of first DRBs associated with the first PDN connection.

6. The UE of claim 1, wherein said controller is to steer the traffic of said plurality of DRBs from said cellular link to said at least one P2P link while maintaining session continuity.

7. The UE of claim 1, wherein said controller is to establish a first P2P link to communicate traffic of all first DRBs of the first PDN connection, and to establish a second P2P link to communicate traffic of all second DRBs of the second PDN connection.

8. The UE of claim 1, wherein said controller is to steer traffic of a DRB of the first PDN connection to said first P2P link, while maintaining traffic of another DRB of the first PDN connection over said cellular link.

9. The UE of claim 1 comprising one or more antennas, a memory and a processor.

10. An evolved Node B (eNB) comprising:
a cellular transceiver to communicate with a User Equipment (UE) via a cellular link; and
a controller to trigger offloading of one or more Data Radio Bearers (DRBs) to at least one Point to Point (P2P) link between said eNB and said UE, the P2P link via a Wireless Local Area Network (WLAN) link between said UE and a WLAN access Point (AP), said cellular transceiver is to send to said UE a Radio Resource Control (RRC) message including WLAN identification information to identify said WLAN AP, and a transport address of said eNB, the controller to establish the at least one P2P link on a per Packet Data network (PDN) connection basis by determining a count of the at least one P2P link based at least on a count of different Packet Data network (PDN) connections associated with a plurality of DRBs, the controller to establish one or more first P2P links with said UE via the WLAN AP to communicate traffic of one or more first DRBs of a first PDN connection with a first PDN Gateway (PGW), and to establish one or more second P2P links with said UE via the WLAN AP, concurrent with the one or more first P2P links to communicate traffic of one or more second DRBs of a second PDN connection with a second PGW.

11. The eNB of claim 10, wherein said controller is to select to steer traffic of a DRB to a P2P link corresponding to the DRB, and said eNB is to send to said UE downlink traffic of said DRB via said P2P link corresponding to the DRB.

12. The eNB of claim 10, wherein, responsive to receiving at said eNB uplink traffic of a DRB via a P2P link corresponding to the DRB, said controller is to steer downlink traffic of said DRB to said P2P link corresponding to the DRB.

13. The eNB of claim 10, wherein said controller is to establish the at least one P2P link based at least on a load of a cellular network of the eNB.

14. The eNB of claim 10, wherein said controller is to establish a first P2P link to communicate traffic of all first DRBs of the first PDN connection, and to establish a second P2P link to communicate traffic of all second DRBs of the second PDN connection.

15. The eNB of claim 10, wherein said controller is to steer traffic of a DRB of the first PDN connection to said first P2P link, while maintaining traffic of another DRB of the first PDN connection over said cellular link.

16. The eNB of claim 10 comprising one or more antennas, a memory, and a processor.

17. A method to be performed at a User Equipment (UE), the method comprising:

routing traffic of a plurality of Data Radio Bearers (DRBs) via a cellular link between the UE and an evolved Node B (eNB);

receiving from the eNB a Radio Resource Control (RRC) message including Wireless Local Are Network (WLAN) identification information to identify a WLAN Access Point (AP), and a transport address of said eNB;

establishing at least one Point-to-Point (P2P) link with said eNB via a WLAN link between said UE and said WLAN AP; and steering traffic of one or more of said plurality of DRBs from said cellular link to said P2P link, wherein establishing the at least one P2P link comprises establishing the at least one P2P link on a per Packet Data network (PDN) connection basis by determining a count of the at least one P2P link based at least on a count of different Packet Data network (PDN) connections associated with said plurality of DRBs, by establishing one or more first P2P links with said eNB via the WLAN AP to communicate traffic of one or more first DRBs of a first PDN connection with a first PDN Gateway (PGW), and by establishing one or more second P2P links with said eNB via the WLAN AP, concurrent with the one or more first P2P links, to communicate traffic of one or more second DRBs of a second PDN connection with a second PGW.

18. The method of claim 17 comprising receiving at said UE downlink traffic of a DRB of said plurality of DRBs via a P2P link corresponding to the DRB, and steering to said P2P link corresponding to the DRB uplink traffic of said DRB.

19. The method of claim 17 comprising selecting to steer to said P2P link uplink traffic of a DRB of said plurality of DRBs, and receiving from said eNB downlink traffic of said DRB via said P2P link.

20. The method of claim 17 comprising moving a DRB, which was steered to said P2P link, back to said cellular link.

21. A product including one or more tangible computer-readable non-transitory storage media comprising computer-executable instructions operable to, when executed by at least one computer processor, enable the at least one computer processor to implement at an evolved Node B (eNB) operations comprising:

communicating with a User Equipment (UE) via a cellular link;

establishing with the UE at least one Multi-Homed-Radio-Bearer (MHRB), the MHRB including a cellular radio bearer over said cellular link and a Point to Point (P2P) link via a Wireless Local Area Network (WLAN) radio bearer; and steering traffic of one or more Data Radio Bearers (DRBs) from said cellular radio bearer to said P2P link, wherein establishing the at least one MHRB comprises establishing a plurality of P2P links on a per Packet Data network (PDN) connection basis by determining a count of the plurality of P2P links based at least on a count of different Packet Data network (PDN) connections associated with a plurality of DRBs, establishing the plurality of P2P links comprises establishing one or more first P2P links with said UE via the WLAN AP to communicate traffic of one or more first DRBs of a first PDN connection with a first PDN Gateway (PGW), and establishing one or more second P2P links with said UE via the WLAN AP, concurrent with the one or more first P2P links, to communicate traffic of one or more second DRBs of a second PDN connection with a second PGW.

22. The product of claim 21, wherein the operations comprise:

sending to said UE a Radio Resource Control (RRC) message including WLAN identification information to identify a WLAN Access Point (AP), and a transport address of said eNB; and establishing said plurality of P2P links with said UE via said WLAN AP.

23. The product of claim 21, wherein the operations comprise selecting to steer traffic of a DRB to a P2P link corresponding to the DRB, and sending to said UE downlink traffic of said DRB via said P2P link corresponding to the DRB.

24. The product claim 21, wherein the operations comprise establishing a first P2P link to communicate traffic of all first DRBs of the first PDN connection, and establishing a second P2P link to communicate traffic of all second DRBs of the second PDN connection.

25. The product of claim 21, wherein the operations comprise moving a DRB, which was steered to said P2P link, back to said cellular radio bearer.

* * * * *

UNITED STATES PATENT AND TRADEMARK OFFICE
CERTIFICATE OF CORRECTION

PATENT NO.         : 9,650,794 B2
APPLICATION NO.    : 14/314256
DATED              : May 16, 2017
INVENTOR(S)        : Alexandre S. Stojanovski et al.

It is certified that error appears in the above-identified patent and that said Letters Patent is hereby corrected as shown below:

In the Claims

In Column 28, Line 38, in Claim 10, delete "P2P links to communicate" and insert -- P2P links, to communicate --, therefor.

Signed and Sealed this
Third Day of October, 2017

Joseph Matal
*Performing the Functions and Duties of the*
*Under Secretary of Commerce for Intellectual Property and*
*Director of the United States Patent and Trademark Office*